Oct. 2, 1962
C. A. RUTIGLIANO
3,056,520
EXTENSIBLE BOAT TRAILER
Filed Dec. 17, 1958
3 Sheets-Sheet 1
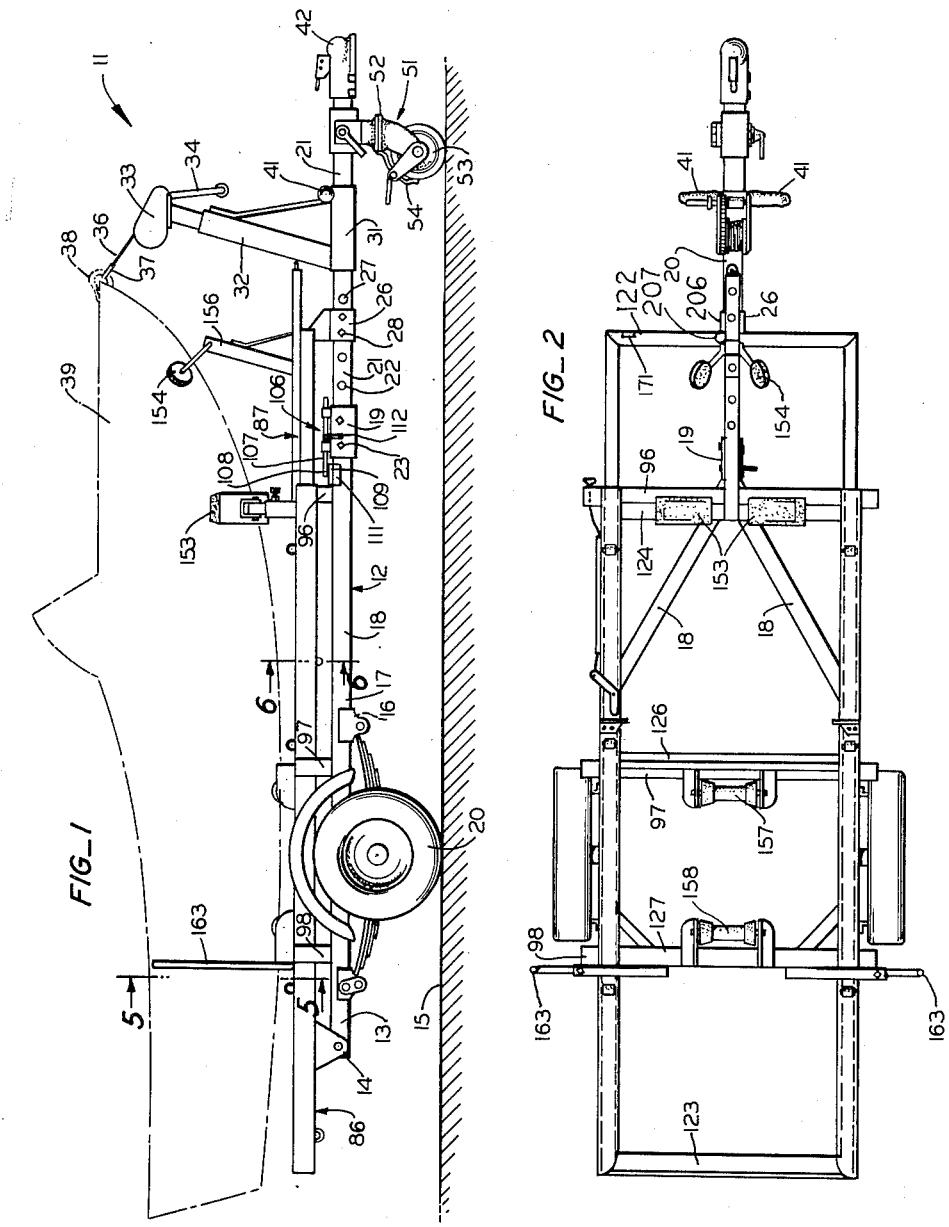
INVENTOR.
CARL A. RUTIGLIANO
BY
Lothrop & West
ATTORNEYS

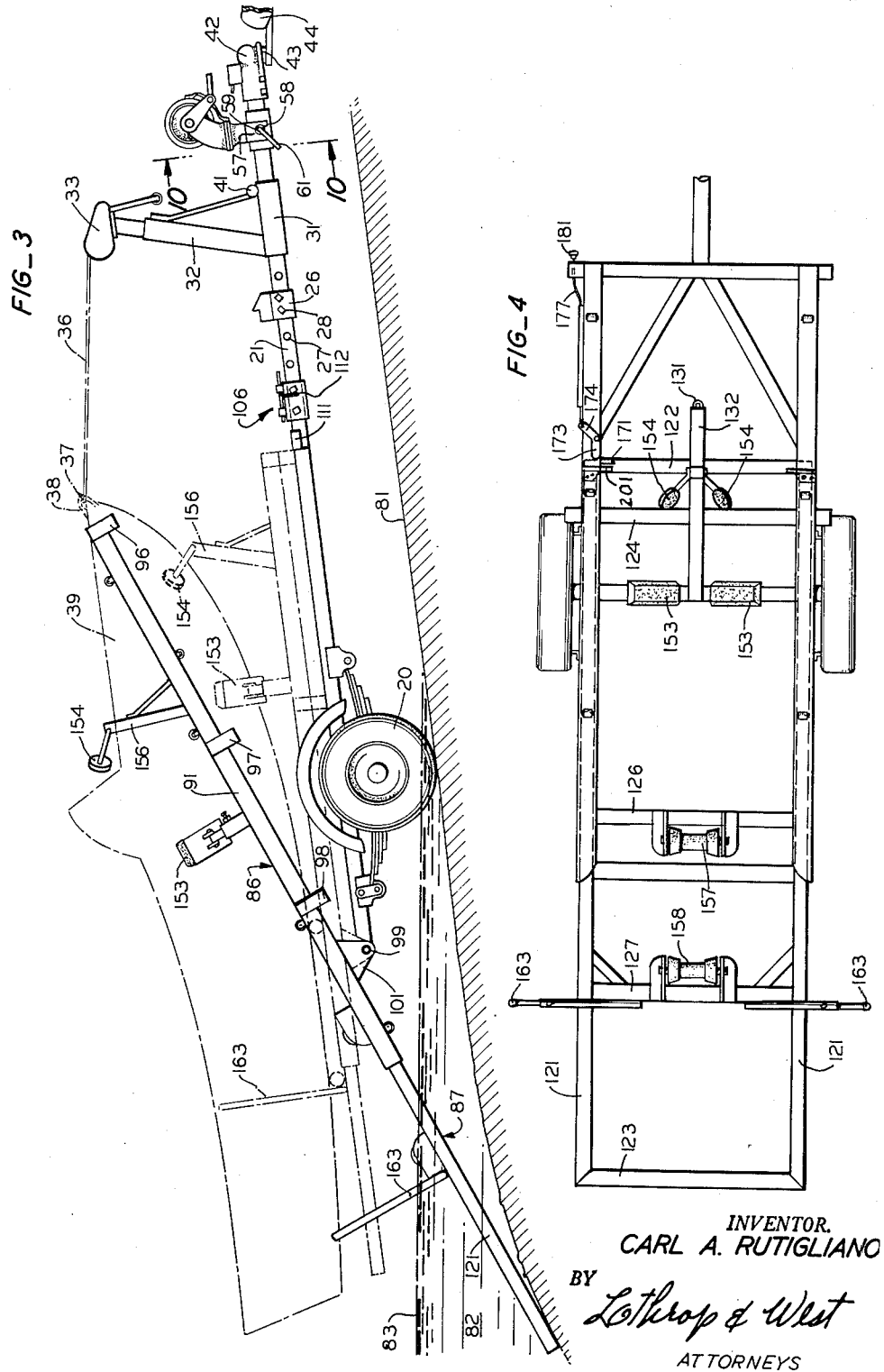

Oct. 2, 1962 C. A. RUTIGLIANO 3,056,520
EXTENSIBLE BOAT TRAILER
Filed Dec. 17, 1958 3 Sheets-Sheet 3
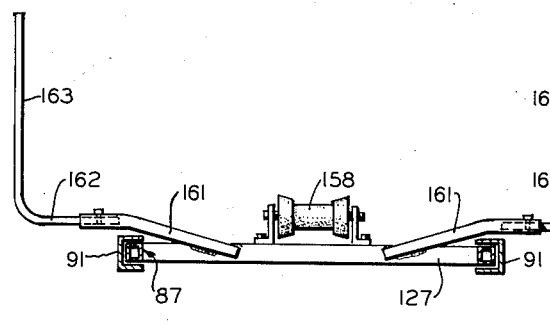
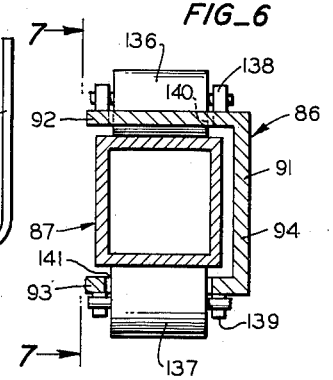
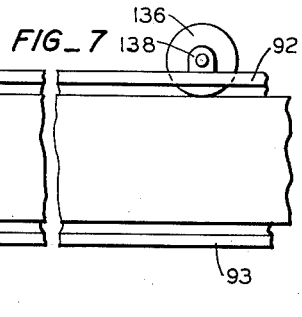
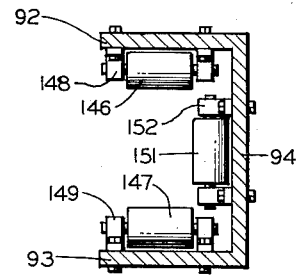
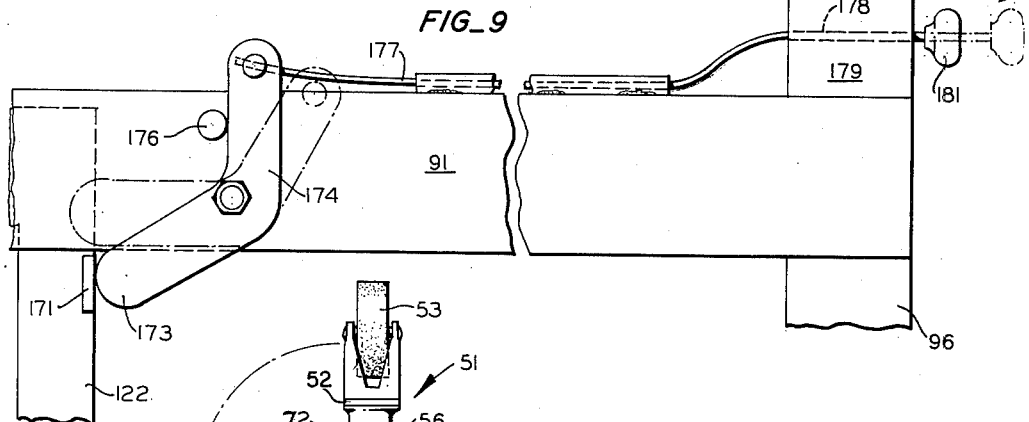
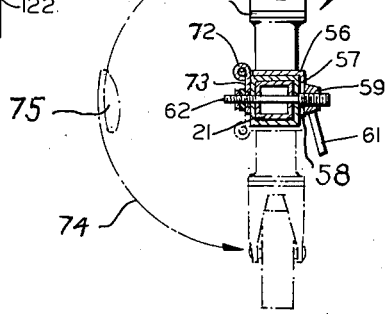
INVENTOR.
CARL A. RUTIGLIANO
BY Lothrop & West
ATTORNEYS

United States Patent Office 3,056,520
Patented Oct. 2, 1962

3,056,520
EXTENSIBLE BOAT TRAILER
Carl A. Rutigliano, Rte. 1, Box 330, Vacaville, Calif.
Filed Dec. 17, 1958, Ser. No. 781,033
4 Claims. (Cl. 214—505)

The invention relates to boat trailers and, more particularly, to trailers whose effective length can be increased at the water's edge to simplify boat launching and recovery.

Considerable numbers of trailers have heretofore been suggested as solutions to the problem of launching and recovering boats without having to back the trailer well into the water. Water, especially salt water, is highly deleterious to the trailer members and causes rapid deterioration of the trailer wheel bearings. Some of the heretofore suggested trailers have found their way to the market place. Almost without exception, however, these have been highly complicated and expensive devices and have possessed but little flexibility or adaptability with respect to boats of various sizes and kinds.

It is therefore an object of the invention to provide an extensible boat trailer which enables the user to launch and recover a boat with relative ease.

It is another object of the invention to provide a boat trailer which is readily adjustable to handle boats of a considerable range of size and kind.

It is yet another object of the invention to provide a boat trailer in which the trailer can be located on dry land or in very shallow water during launching and recovery.

It is still another object of the invention to provide a boat trailer which is not only readily hauled by a motor vehicle but which can also be easily maneuvered when disconnected from the towing vehicle.

It is a further object of the inevntion to provide a boat trailer having a third wheel which is readily locked in operative position and just as readily rendered inoperative and located in an out of the way position, when desired.

It is still a further object of the invention to provide a boat trailer in which complete control of launching and recovery can be located in the hands of one person.

It is a yet further object of the invention to provide an extensible boat trailer which is not only relatively economical to make but which is also durable, and long-lived and requires but a minimum of upkeep and maintenance, partly owing to the fact that its wheels need not be immersed in the water.

It is yet another object of the invention to provide a boat trailer having means for achieving a nice balance both of the boat on the trailer and the trailer on the towing vehicle.

It is still another object of the invention to provide a trailer whose effective operation is substantially independent of the slope and surface condition of the launching ramp.

It is another object of the invention to provide a generally improved boat trailer.

Other objects, together with the foregoing, are attained in the embodiment described in the following description and shown in the accompanying drawings, in which:

FIGURE 1 is a side elevation of the trailer in retracted condition, and showing the third wheel in operative position, with a boat indicated in outline;

FIGURE 2 is a plan view of the trailer with the members in retracted location as in FIGURE 1;

FIGURE 3 is a side elevation of the trailer in extended and tilted condition and showing, in outline, a boat and certain of the trailer members in the position assumed just before and just after tilting occurs, the third wheel being shown in its inoperative location;

FIGURE 4 is a fragmentary plan of the trailer with certain of the members being shown in the position in which they are temporarily locked during boat recovery proceedings;

FIGURE 5 is a transverse section of the movable frame members, the plane of section being indicated by the line 5—5 in FIGURE 1;

FIGURE 6 is a section of one form of channel and roller arrangement, the plane of section being indicated by the line 6—6 in FIGURE 1;

FIGURE 7 is a fragmentary side elevation of the structure shown in FIGURE 6;

FIGURE 8 is a section comparable to that of FIGURE 6 but showing a variant form of channel and roller structure;

FIGURE 9 is a fragmentary plan of the frame locking mechanism showing the locking and releasing elements in their respective extreme locations; and FIGURE 10 is a section on the line 10—10 in FIGURE 3 showing the third wheel structure, the wheel also being illustrated, in outline, in its operative position.

While the extensible boat trailer of the invention is susceptible of numerous physical embodiments, depending on the environment and requirements of use, substantial numbers of the herein shown and described embodiment have been made and used and all have performed in an eminently satisfactory manner.

A trailer of the invention, generally designated by the numeral 11, includes a horizontal rigid or fixed frame 12 having a pair of longitudinal side runners 13 appropriately strengthened and tied together by cross-beams, such as a rear cross-beam 14 and a front cross-beam 16, the trailer being supported on the ground 15, in conventional fashion, on a pair of ground-engaging wheels 20.

The runners 13 are bent inwardly adjacent their forward ends 17 to form a pair of struts 18 converging at their forward ends and having mounted thereon a collar structure 19 within which is disposed a draw-bar 21. Owing to the provision of suitably spaced openings 22 on the draw-bar and fastenings 23 on the collar, the draw-bar can be longitudinally shifted with respect to the fixed frame structure to achieve the balance desired.

In somewhat comparable fashion, a frame support and stop 26 is longitudinally shiftable with respect to the draw-bar 21, openings 27 and fastenings 28 being conveniently used for this purpose.

Located forwardly from the stop and support member 26 is a square sleeve 31 mounted on the draw-bar 21 and serving to support a standard 32 surmounted by a conventional winch structure 33 provided with the usual crank 34 and wire rope 36 having a hook 37 adapted to engage, for example, with an eye 38 on a boat 39.

Also mounted on the sleeve 31 is a pair of oppositely extending rubber-covered handles 41 enabling the user to manipulate the trailer, to move it as desired and to lift the adjacent end of the draw-bar so that the towing socket 42 can be inserted, in conventional fashion, on a corresponding knob 43 on the towing vehicle 44.

FIGURE 1 illustrates the trailer and boat in the condition they usually assume during storage or non-use. In this situation, a third wheel 51 is found to be of great help, not only to eliminate the need for blocks but also to permit the user to move the trailer when necessary. The third wheel 51 includes a wheel post 52 having journalled thereon a wheel 53 and is preferably provided with a self-locking brake mechanism 54 of a standard variety.

As can most clearly be seen in FIGURE 10, the wheel post 52 is secured to an angle bar 56 having a vertical portion 57 bifurcated (see FIGURE 3) to provide a pair of downwardly extending fingers 58 straddled by a centrally tapped and threaded boss 59 rotated by a handle 61. The boss is threaded on the stem of a bolt 62 extending across the draw-bar.

Pivotally mounted, as by a hinge 72, on the angle bar 56 is a plate 73 through which the pin 62 extends. To move the wheel from the position shown in full line in FIGURE 10, the boss 59 is loosened, the angle bar 56 is swung upwardly and the wheel is moved downwardly as indicated by the arrow 74. Concurrently, the plate 73 is rotated 180°, the movement of the wheel being diagrammatically shown by the loop 75. The hinge 72 is thus located at the bottom, permitting the angle 56 to be swung upwardly so that the fingers 58 are under the boss 59. Clamping is effected by rotating the handle 61.

One of the most useful aspects of the boat trailer of the invention is its ability to provide a highly convenient boat launching and a boat recovery, procedures which have in times past been accomplished only by backing the towing vehicle down a launching ramp 81 (see FIGURE 3) until the trailer's wheels are far out in the water 82, frequently with the entire wheels immersed below the water level 83.

Owing to the provision of two additional frame members, generally designated a tilting frame 86 and a sliding frame 87, respectively, both of which act in conjunction with the positive buoyancy of the stern portion of the boat 39, an entirely new and extremely desirable result is effected.

The tilting frame 86 comprises, as can be seen most clearly in FIGURES 3 and 6, a pair of elongated channels 91, each U-shaped in section and opening inwardly, the channel including an upper flange 92, a lower flange 93 and a vertical connecting web 94. At suitable intervals a plurality of cross-beams 96, 97 and 98 strengthen and provide rigidity to the tilting frame 86.

The bottoms of the cross-beams are supported on the fixed frame 12 when the tilting frame is parallel to the fixed frame, the fixed frame thereby bearing the entire superposed weight in distributed fashion during towing and storage. During launching and recovery, however, the tilting frame is angularly inclined with respect to the fixed frame, as appears most clearly in FIGURE 3, tilting occurring about the axis of a pair of pins 99 on which a corresponding pair of gusset plates 101, depending from the after portion of the tilting frame 86, is pivotally mounted.

The tilting frame can be locked in down, or parallel, position with respect to the fixed frame, if desired; and locking of the tilting frame is preferably always effected during towing. The locking structure 106 (see FIGURE 1) includes a sliding bolt 107 whose projection 108, or latch, can be slid rearwardly to override a plate 109 mounted on and projecting forwardly from the center of the cross-beam 96. A pair of skirts 111 depending from the opposite edges of the plate 109 serve to hold the front end of the tilting frame in fixed lateral relation with respect to the draw-bar, a feature which is most helpful in preventing side sway of the tilting frame when the towing vehicle negotiates a sharp corner. A handle 112 on the sliding latch bolt facilitates operation of the bolt.

As appears most clearly in FIGURE 3, launching and recovery of the boat 39 is effected not only by inclining the tilting frame 86. Cooperating with the fixed frame and with the tilting frame is another or third frame 87, termed a sliding frame, as previously mentioned.

The sliding frame is generally rectangular in plan and comprises a pair of longtiudinal members 121, a front cross-beam 122, an after cross-beam 123 and a suitable number of intermediate cross-beams 124, 126 and 127 (see FIGURE 4).

The sliding frame members are, in section, of hollow box shape, as appears most clearly in FIGURE 6, the sliding frame therefore being somewhat buoyant when not subjected to superposed weight. Thus, in the event the launching were very steep or there was a drop-off at the launching area, the sliding frame and tilting frame "float" at a fairly low angle of tilt once they are relieved of the weight of the boat. This permits the user to reach easily the eye 131 at the forward end of a tongue 132 extending forwardly from the front cross-beam 122 and to insert in the eye 131 the winch hook 37 so as to retract the empty sliding frame.

The sliding frame 87 is freely translatable within the tilting frame 86 owing to the provision of suitable upper rollers 136 and lower rollers 137 mounted in brackets 138 and 139, respectively, on the tilting frame. In the form shown in FIGURES 6 and 7, the upper and lower rollers extend through corresponding openings 140 and 141 in the flanges 92 and 93 of the tilting frame runners.

A somewhat variant form is shown in FIGURE 8 wherein the upper rollers 146 and the lower rollers 147 are mounted in brackets 148 and 149, respectively, the brackets being fastened as by bolts on the inner sides of the flanges 92 and 93. A suitable number of side rollers 151 are also mounted in brackets 152 bolted to the inner side of the web 94 to guide the sliding frame even more smoothly.

It is apparent that the sliding frame 87 serves as a cradle or support for the boat 39. Accordingly, appropriate numbers and kinds of supporting members are provided on the sliding frame. Such members include, for example, a pair of bow pads 153, a pair of bow stops 154 secured to a standard 156, a forward keel roller 157, an after keel roller 158 and, where necessary, additional supporting blocks or rollers placed at advantageous locations. The rollers, such as the rollers 157 and 158, are made vertically adjustable in any of a number of convenient manners which will occur to one skilled in the art.

As has been apparent throughout, many of the trailer members have been made adjustable to permit of adjustments as to balance and weight distribution. Adjustment of the rollers and the other boat supporting elements is highly important so as to provide a firm cradling.

Extending laterally from the cross-beam 127 (see FIGURE 5) is a pair of tubes 161 within which is disposed a pair of pipes 162 of smaller diameter, the pipes 162 being upturned to provide a pair of spaced vertical members 163. A pair of set screws 164 allows lateral adjustment. Preferably the tubes and pipes are covered with rubber or other resilient material and thus serve as additional boat confining members. Furthermore, when recovery of the boat is to be undertaken, the vertical members serve as guides between which the bow of the boat is led.

As recovery of the boat is being effected, the trailer is backed up so as to assume with respect to the water the approximate location shown in FIGURE 3. The bolt latch 106 is then released and the sliding frame extended until the center of gravity of the combined tilting frame and sliding frame is abaft the pivot 99. At this juncture the tilting and sliding frames will tilt to about the angle shown in FIGURE 3. The bow of the boat is thereupon conducted between the guide members 163 and the winch cable is secured to the boat. As the cable takes up, the boat is urged onto the rollers and is rolled forwardly on the sliding frame until sufficient boat weight causes the forward movement of the boat to be transmitted to the sliding frame which itself commences to slide forwardly in the tilting frame.

As the center of gravity of the combined movable frames and boat passes forwardly over the pivots 99, the movable frames and the boat tilt downwardly until they rest on the fixed frame in parallel relation thereto.

At this juncture, a vertical upstanding or projecting stop-plate 171 (see FIGURES 4 and 9) mounted on the forward upper corner of the front cross-beam 122 on the sliding frame comes into abutment with the adjacent arm 173 of a bell-crank 174 pivotally mounted on the tilting frame side runner 91, the bell-crank having been pushed against a positioning pin 176 by a flexible rod 177, or cable, leading forwardly through an opening 178 in a lateral extension 179 of the forwardmost crossbeam 96 of the tilting frame. A knob 181 on the end of the rod is therefore conveniently located near the position of the operator who is ordinarily standing near the winch when recovery takes place.

Winching is continued until the boat is pulled forwardly, relative to the sliding frame which is halted by the bell-crank, and until the boat abuts the boat stops 154. At this point the operator pulls forwardly on the knob 181, moving the bell-crank out of abutment with the sliding frame stop 171. Thereafter, further pull on the cable urges the boat and the sliding frame forwardly until the sliding frame abuts the stop and support member 26.

The sliding frame's outward extension is limited by a stop 201 projecting inwardly (see FIGURE 4) into interference with the upstanding plate 171. At its innermost or retracted location the sliding frame is locked to a flange 206 on the limit stop 26 (see FIGURE 2) by a pin 207 inserted through an opening in the forward crossbeam and a registering opening in the subjacent flange 206.

It can therefore be seen that I have provided an extensible boat trailer which is not only highly flexible and adaptable to boats of various sizes and contours but which is also very convenient and safe to use.

What is claimed is:
1. An extensible boat trailer comprising:
   a. a fixed frame mounted on ground-engaging wheels;
   b. a tilting frame pivotally mounted on said fixed frame abaft said wheels;
   c. a sliding frame translatably mounted in said tilting frame for fore and aft relative motion with respect thereto;
   d. a boat cradle on said sliding frame including a forward stop member;
   e. means for temporarily limiting the forward movement of said sliding frame at a predetermined location with respect to said fixed frame as a boat is drawn forwardly on said cradle and against said forward stop member, said temporary limiting means including a bell crank pivotally mounted on said tilting frame, one arm of said crank being selectively movable between a first position and a second position, and a plate mounted on said sliding frame, said plate being in interfering relation with said crank arm in said first position and in non-interfering relation in said second position of said crank arm; and
   f. means for deactivating said sliding frame limiting means after a boat is in abutment with said forward stop member.

2. An extensible boat trailer comprising:
   a. a fixed frame mounted on ground-engaging wheels, said fixed frame including a forwardly extending draw-bar;
   b. a tilting frame pivotally mounted on said fixed frame abaft said wheels;
   c. a sliding frame translatably mounted in said tilting frame for fore and aft relative motion thereto, said sliding frame including a boat cradle having a bow-stop;
   d. a sliding frame support and stop member shiftably mounted on said draw-bar for selective longitudinal positioning thereon, said support and stop member being adapted to stop and support the forward end of said sliding frame; and
   e. means for securely positioning said support and stop member at a selected longitudinal location on said draw bar with the bow of a boat against said bow-stop and with the forward end of said sliding frame positioned in said support and stop member.

3. The device of claim 2 wherein said support and stop member positioning means includes a plurality of longitudinally spaced openings in said draw-bar and a plurality of fastenings on said support and stop member adapted selectively to engage and disengage the walls of registering ones of said openings in said draw-bar.

4. The device of claim 2 further characterized by means for temporarily restraining the forward movement of said sliding frame at a location spaced rearwardly from said support and stop member as a boat is urged forwardly on said boat cradle and against said bow-stop; means for deactivating said temporary restraining means; and means for securing said sliding frame to said support and stop member.

References Cited in the file of this patent

UNITED STATES PATENTS

| 2,621,814 | Lisota | Dec. 16, 1952 |
| 2,711,259 | Jones | June 21, 1955 |
| 2,713,951 | Davies | July 26, 1955 |
| 2,834,492 | Roy et al. | May 13, 1958 |
| 2,919,825 | Hornsby | Jan. 5, 1960 |

FOREIGN PATENTS

| 61,610 | France | Dec. 1, 1954 |